Feb. 20, 1951 T. F. HARVEY 2,542,515
INTERMITTENT MOVEMENT MECHANISM
Filed June 14, 1949 4 Sheets-Sheet 1
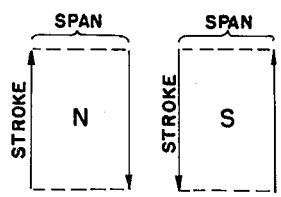
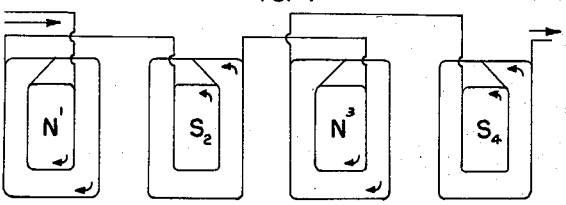
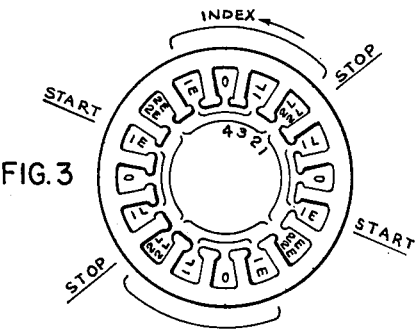
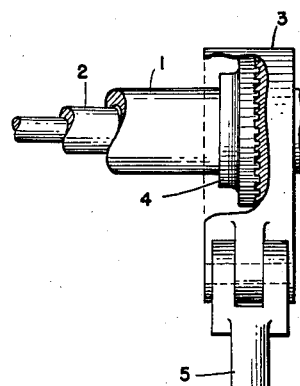
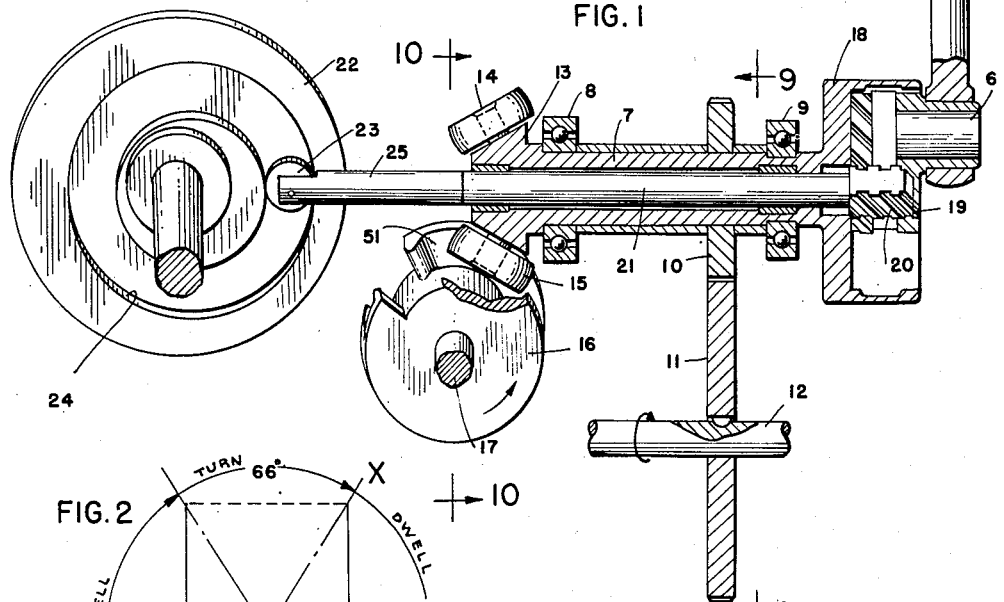
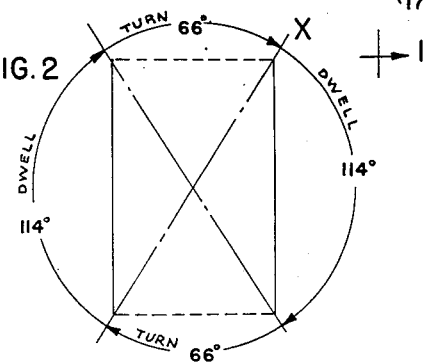
INVENTOR:
THADDEUS F. HARVEY
BY
Rummler, Rummler & Snow
ATT'YS Feb. 20, 1951 — T. F. HARVEY — 2,542,515
INTERMITTENT MOVEMENT MECHANISM
Filed June 14, 1949 — 4 Sheets-Sheet 2
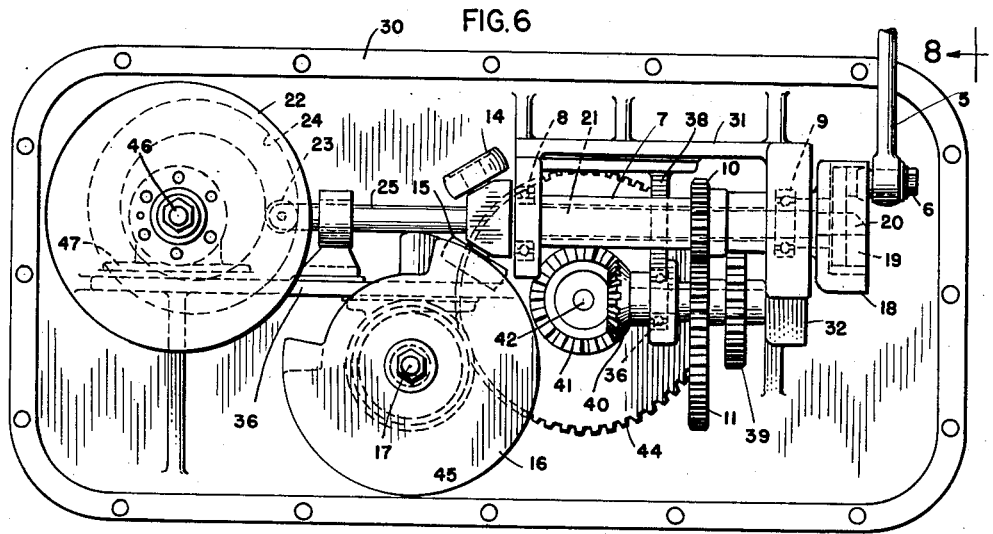
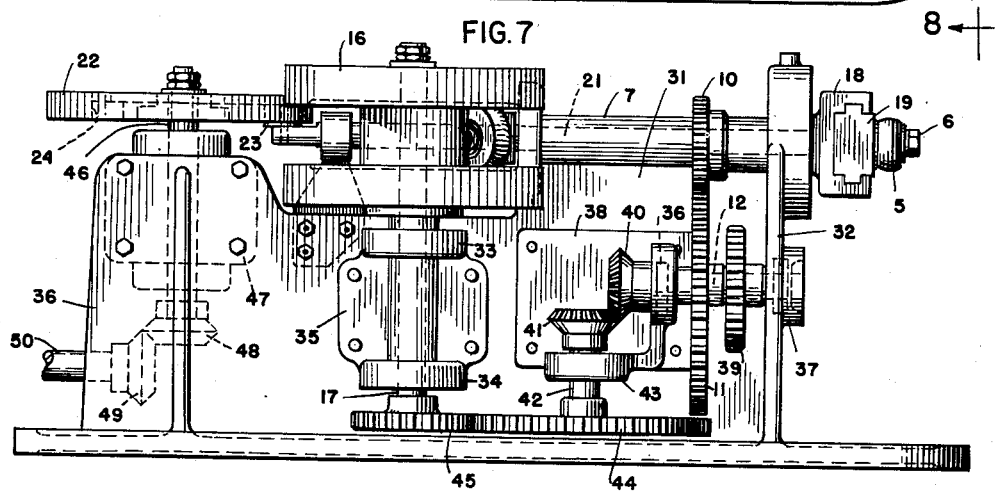
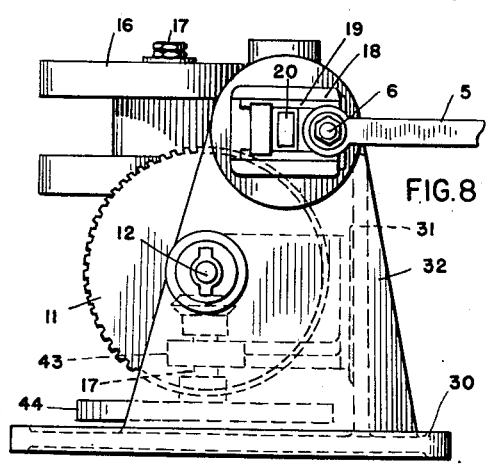
INVENTOR:
THADDEUS F. HARVEY
BY
Rummler, Rummler + Snow
ATT'YS Feb. 20, 1951 T. F. HARVEY 2,542,515
INTERMITTENT MOVEMENT MECHANISM
Filed June 14, 1949 4 Sheets-Sheet 3

INVENTOR:
THADDEUS F. HARVEY
BY
ATT'YS

Feb. 20, 1951 T. F. HARVEY 2,542,515
INTERMITTENT MOVEMENT MECHANISM
Filed June 14, 1949 4 Sheets-Sheet 4

INVENTOR:
THADDEUS F. HARVEY
BY
Rummler, Rummler & Snow
ATT'YS

Patented Feb. 20, 1951

2,542,515

UNITED STATES PATENT OFFICE 2,542,515

INTERMITTENT MOVEMENT MECHANISM

Thaddeus F. Harvey, South Bend, Ind., assignor to Bodine Electric Company, Chicago, Ill., a corporation of Illinois Application June 14, 1949, Serial No. 98,905

10 Claims. (Cl. 74—426)

1

This invention relates to devices for imparting intermittent movement to a driven mechanism and particularly to such devices which, while driven by a constant speed or continuously moving power source, will operate only at predetermined intervals.

The main objects of this invention are to provide an improved mechanism for causing intermittent operation of a driven mechanism; to provide such a device which will operate at exactly timed intervals in the driving cycle; to provide such a device which will impart exact predetermined increments of angular movement in a driven mechanism; to provide an improved rotary intermittent movement mechanism which will operate quietly and smoothly regardless of the load transmitted through the mechanism; to provide such a device in which the intermittently moving elements are accelerated and decelerated with the smoothness and exactitude of a simple harmonic motion; and to provide an improved intermittent movement mechanism of a simple rugged construction that will transmit relatively heavy loads through exact increments of angular movement regardless of the speed of operation of the mechanism.

Other objects are to provide an improved rotary intermittent mechanism which may be constructed in substantially any size without loss of accuracy in its operation; to provide such a mechanism which may be built to transmit relatively heavy loads without loss of accuracy or efficiency in its operation; and to provide such a mechanism that is readily adaptable to substantially any apparatus wherein an intermittent rotary action is desired.

Intermittent movement mechanisms, generally, are well known and are employed in many different environments and kinds of apparatus, some of which require a high degree of accuracy of operation particularly with respect to registry of the driven part with some other coacting device. It is for apparatus requiring accuracy of operation of the driven element that the present invention was devised and while specific applications of the invention are herein shown and described it is to be understood that the use of the invention is not intended to be limited to such applications. Rather the invention is intended for use in any situation in which an intermittent movement is desired and a construction according to the present invention may be utilized.

A specific embodiment of this invention is shown in the accompanying drawings in which:

Figure 1 is a schematic view, with parts in sec-

2 tion, showing the improved intermittent movement device embodied in the variable stroke span control mechanism of a machine for winding the stators of electric motors.

Fig. 2 is a diagram illustrating the nature of the intermittent movement in the driven mechanism as provided and controlled by the device of Fig. 1.

Fig. 3 is a diagrammatic view showing the end of a stator and illustrating a coil winding problem requiring a high degree of accuracy and control in the winding machine and for which the improved intermittent movement device is particularly suitable.

Fig. 4 is a diagrammatic view showing the developed windings of a typical four pole stator and illustrating the type of work that may be done by the mechanism of Fig. 1.

Fig. 5 is a diagrammatic view illustrating the stroke and span operations of the winding machine, the span movement being the operation performed and controlled by the intermittent movement device of Fig. 1.

Fig. 6 is a plan view of a stator winding machine span operating mechanism embodying the improved intermittent mechanism.

Fig. 7 is a view of the same in side elevation.

Fig. 8 is an end view of the same as seen from the line 8—8 on Fig. 7.

Figure 10:
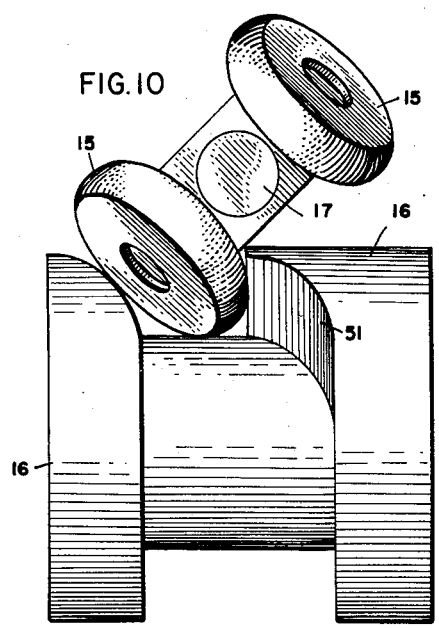
Fig. 10 is an end view of the intermittent device showing the manner of engagement of the bearing elements and the control cam.
Figure 11:
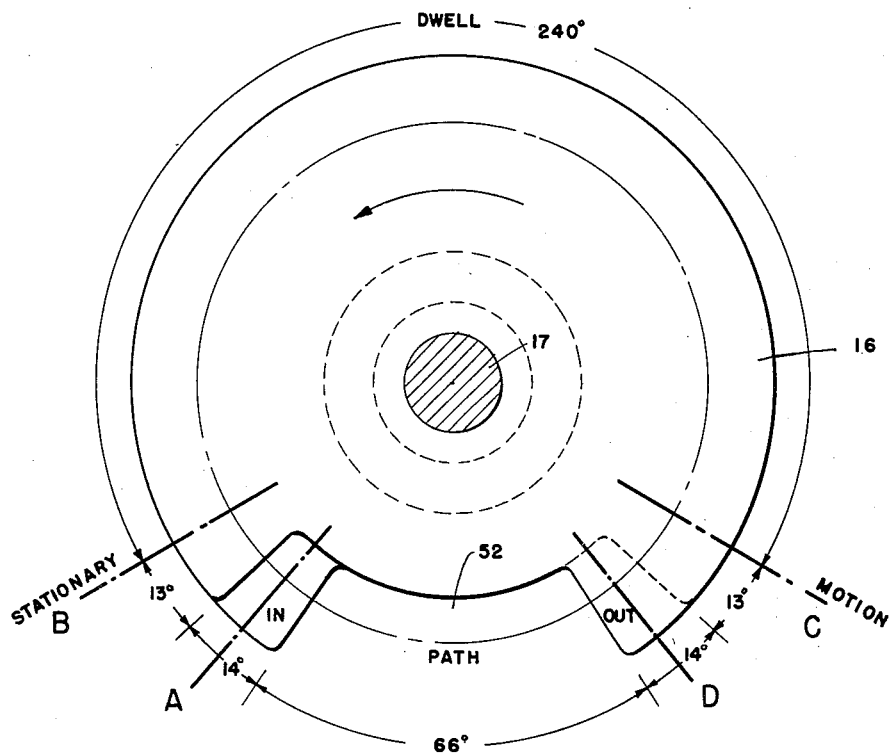
Fig. 11 is a top plan view of the control or operating cam for the intermittent device.
Figure 12:
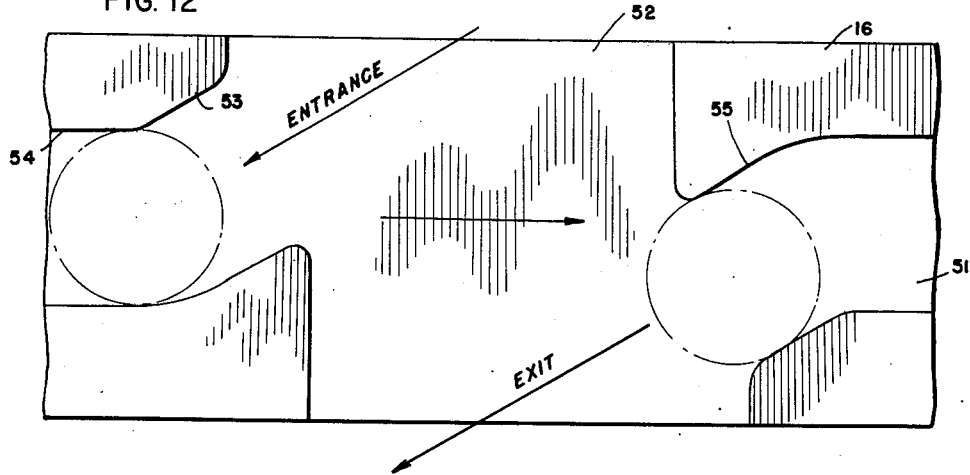
Fig. 12 is an enlarged fragmentary side view of the control cam showing the form and arrangement of the operating cam surfaces by which timing and control of the intermittent device is obtained.

In the form shown in the drawings Figs. 1 and 6 to 11 inclusive show the improved intermittent device in association with the span operating and control mechanism of an automatic stator winding machine, such a mechanism being a particular example of a situation where great accuracy of operation is an essential factor for efficient high speed production; and Fig. 12 shows the intermittent device as it may be embodied in a motion picture apparatus. These examples of application of the invention serve to illustrate the adaptability of the invention to mechanisms having widely different speed and load factors and space or size considerations.

As shown in Figs. 1 to 11 inclusive the intermittent device is particularly arranged to operate and control the span operation of the wire gun, of a stator winding machine, which element, though not shown, will be understood to be the device which threads or leads the winding wire through the required path to form the windings on the poles of a stator. As is well known, in the stator winding machine art, the wire gun is a reciprocating element which oscillates at the end of each stroke to lead the winding wire angularly across the span between the stator pole slots. The extent of this angular movement or turn of the wire gun during its oscillation must be very accurately controlled to obtain proper alignment with the respective stator slots so that on the next axial stroke of the wire gun the winding wire will be accurately positioned in the slot. This is the function of the intermittent device.

Referring particularly to Fig. 1, the main carrier or support for the wire gun is indicated by the numeral 1 and is usually a tubular member rotatably mounted in fixed bearings, a reciprocable wire gun shaft 2 is slidably mounted within the tubular carrier 1 and is keyed to the carrier for rotation therewith, and the wire gun, not shown, is mounted on the end of the shaft 2 which projects beyond the end of the carrier 1. The shaft 2 is reciprocated by means, not shown, to cause the wire gun to pass back and forth axially through the center opening of a stator to effect the stroke movements of the wire gun; and the carrier 1 is oscillated in predetermined timed relation with the stroke movements of the shaft 2 to oscillate the wire gun angularly, between strokes, to effect the span movement of the wire gun.

The oscillation or rotation of the carrier 1 is obtained by means of a reciprocable rack 3 which is suitably mounted in slide-ways, not shown, and arranged to engage a gear 4 fixedly mounted on the carrier member 1. The rack 3 is reciprocated linearly to effect rotation of the gear 4 and the carrier member 1, by means of connecting rod 5 which is mounted on a crank pin 6 which in turn is driven by the intermittent mechanism. As indicated in Fig. 1, the driven end of the connecting rod 5 is suitably journaled on the crank pin 6 and its opposite end is formed with a clevis for pivotal connection with the rack 3.

The intermittent device which drives the crank pin 6 and the connecting rod 5, comprises a hollow shaft 7, rotatably mounted in a pair of fixed bearings 8 and 9. This shaft carries a fixed pinion 10 which in turn is meshed with a driving gear 11 mounted fast on a shaft 12; and the gear 11 is driven by a constant speed power source, not shown. The crank pin 6 is eccentrically mounted on one end of the intermittent shaft 7 and as the shaft 7 is driven by the gear and pinion, 11 and 10 respectively, the connecting rod 5 is caused to reciprocate to drive the rack 3 which in turn rotates the carrier 1 through predetermined increments of angular movement according to the amount of eccentricity of the crank pin 6 relative to the axis of the intermittent shaft 7.

Figure 9:
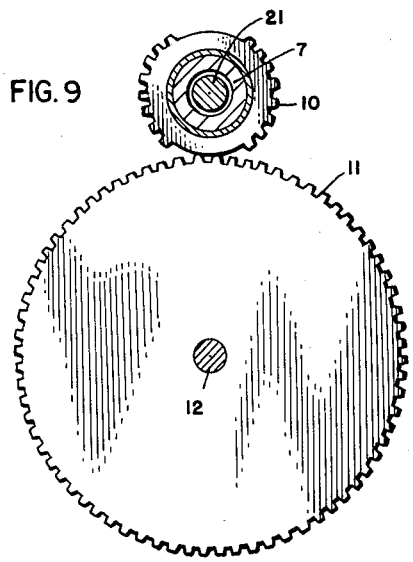
Fig. 9 is a view of the driving gear and pinion for the intermittent device, as taken on line 9—9 of Fig. 1, showing the pinion arrangement for permitting a predetermined dwell in the intermittent operation.

As will be later described, the gear teeth on the pinion 10 are interrupted at predetermined locations, as shown in Fig. 9, so that though the gear 11 rotates continuously, the shaft 7 will be turned only when the teeth on the pinion 10 engage the gear 11, and will stop whenever the interrupted tooth portions of the pinion 10 become radially aligned with the gear 11. This action is substantially the same as that obtained from the old and well known Geneva type of movement and the crank pin 6 will be driven only when the teeth of the pinion are meshed with the gear 11, thereby imparting an intermittent reciprocating motion to the connecting rod 5 and the rack 3. The pinion and gear are not, however, self-engaging, as in the case of a Geneva movement and additional means for that purpose must be provided.

The means for causing engagement of the teeth on the pinion 10 with the gear 11 at predetermined timed intervals, and for holding the intermittent shaft 7 stationary whenever the interrupted toothed portions of the pinion 10 are tangential with the gear 11, is located at the opposite end of the shaft 7 from the driven means or crank pin 6, and, as shown, comprises a hub or head 13 integral on the shaft 7 and carrying a pair of outwardly projecting bearing elements 14 and 15, which are located at diametrically opposite positions on the head 13. In the form shown, the bearing elements are disposed with their axes projecting outwardly from the head 13, at an angle relative to the axis of the shaft 7, and extend into the path of a rotary cam 16, which is a specially designed device adapted to successively engage the bearing elements 14 and 15, and hold them successively in a fixed position for a predetermined time and then release them in such a manner as to cause sufficient rotation of the shaft 7 to effect engagement of the teeth on the pinion 10 with the gear 11. The particular construction of the control cam 16 will be hereinafter described in detail.

As shown, the cam 16 is driven at a constant speed by a shaft 17 which in turn is driven by means of a connection, not shown, from the shaft 2 and the source of the power therefor. Thus the gear 11 and the cam 16 operate in timed relation and the gear will drive the pinion 10 and the shaft 7 only when the bearing elements 14 and 15 are released from the cam 16; and during the period that the bearing elements 14 and 15 are engaged with the cam 16, the intermittent shaft 7 will be held stationary, without any possibility of backlash or override in the angular movement of the crank pin 6, so that only the exact predetermined amount of rotation of the wire gun carrier 1 will occur to effect the angular or span movement of the wire gun.

This exact predetermined angular movement of the gun and the period of dwell, or the period where the angular position of the wire gun must be held stationary, is illustrated by the diagram of Fig. 2 which shows the periods of angular motion and dwell of the wire gun during one cycle of its operation. Thus the wire gun cycle, beginning at the point x in the diagram of Fig. 2, first comprises a stroke which occupies the dwell period of the intermittent operation, then a turn through a predetermined increment of angular movement under the operation of the intermittent device, then a second or return stroke during a dwell period of the intermittent device, and finally a second turn through the predetermined increment of angular movement upon the next operation of the intermittent device. Since the stroke movements of the wire gun must be made while the wire gun is held fast against any angular movement, and since the extent of the angular movement of the wire gun to effect its span operation must be precisely a predetermined amount, it will be seen that the intermittent device must be capable of a very high degree of accuracy in its operation.

In order to illustrate the operations of a stator winding machine for the control of which the improved intermittent movement device is particularly adaptable, reference is made to Fig. 3 which shows an end view of a typical four pole stator; and wherein each pole is to be provided with two separate coils or windings which are formed about a common center. The wire gun which forms these windings is usually designed to wind diametrically opposite poles simultaneously and in winding the poles the desired number of turns are first placed in the slots comprising the center coil and then the span of the wire gun is shifted to wind the second or outer coil of the pole. When the second or outer coil is completed, the stator is indexed through a predetermined angular turn and the coils are then wound about the intermediate poles.

The slots indicated by O represent the pole centers and in the winding operation, the wire gun on its first stroke through the stator lays the wire in the slot 1—E. The wire gun is then turned angularly through the span to an alignment with the slot 1—L and, after the span has been made, the wire gun performs its second stroke through the stator in the opposite direction of the first stroke and lays the wire in the slot 1—L. The wire gun is then turned in the reverse direction through the span distance and, upon ceasing rotation, makes another stroke through the stator to again lay the wire in the slot 1—E, after which the wire gun turns through the span distance and returns through the stator to lay the wire in the slot 1—L.

This operation is continued until the desired number of turns have been laid in the slots for the inner coil, after which the span distance or angular movement of the wire gun is automatically adjusted for the spacing of the slots of the second or outer coil and the winding operation is continued, the wire being laid through the slot 2—E on the first stroke of the wire gun and returned through the slot 2—L on the second or return stroke of the wire gun after it has passed through the span distance. The winding operation is then continued until the second or outer coil has been provided with the desired number of turns at which time the stator is indexed for the winding of the intermediate poles. The intermediate poles are wound in the opposite direction of the first poles as indicated in the diagram of Fig. 3 and for this operation, the sequence of movements of the wire gun are reversed. The mechanism for effecting the reverse winding operation of the wire gun forms no part of the present invention, and therefore, need not be discussed.

Fig. 4 shows the winding of a four pole stator in developed form and indicates the path of the wire as it is laid around the poles and through the pole slots by the wire gun. The north poles are wound simultaneously and then, after the stator is indexed and the winding mechanism is reversed, the south poles are simultaneously wound. After the winding of the coils has been completed the appropriate ends of the wires are connected together so that the several coils will be connected together in series, as will be readily understood. The difficult factor, however, in the winding operation is the accurate alignment of the wire gun with the pole slots since the pole slots are relatively narrow as indicated in Fig. 3, and unless accurate alignment of the wire gun with the slots is had, wire breakages are bound to occur. Thus the span operation of the wire gun must be controlled with a high degree of accuracy, and it is this accuracy of control that the intermittent device affords.

As before mentioned, the span movement of the wire gun is variable through adjustment of the eccentricity of the crank pin 6 relative to the axis of the intermittent shaft 7, such adjustment being the means by which the span of the wire gun is shifted to form the windings of the outer coil after the winding of the inner coil has been completed. The span distance for the outer coil is double that for the inner coil in the particular stator illustrated in the Fig. 3. Thus, as embodied in a stator winding mechanism, the intermittent device includes means for automatically changing the span distance, or increment of angular rotation of the wire gun carrier 1, upon the completion of the winding of one coil. This span change mechanism forms no part of the present invention and will, therefore, only be briefly referred to.

As shown in Fig. 1, the crank pin end to the intermittent shaft 7 is provided with a relatively large head 18 in which a hollow slide 19 is mounted in suitable slide-ways, for radial movement relative to the axis of the shaft 7. The crank pin 6 is mounted fast on this slide 19 and the amount of eccentricity of the crank pin determines the span distance. The position of the slide 19, radially relative to the axis of the shaft 7, is controlled by a rack 20 having teeth on opposite faces which are disposed at an angle of 45 degrees relative to the axis of the shaft 7. The rack 20 is mounted on the end of an operating shaft 21 which extends centrally through the hollow intermittent shaft 7 and projects outwardly beyond the control head or hub 13. The hollow slide 19 is provided with rack teeth on its inner surfaces arranged to mate with the teeth on the rack 20. Thus, through the angular or inclined engagement of the teeth on the rack 20 and the teeth formed on the inner surfaces of the slide 19, the slide 19 may be caused to shift radially relative to the axis of the intermittent shaft 7 merely by changing the position of the rack 20 axially in the crank head 18.

This shifting of the rack 20 is accomplished by means of a cam 22 which is arranged to engage a roller 23 on the outer end of the shaft 21. The cam track 24 of the cam 22 is eccentric to the axis of the cam 22, and thus, by rotation of the cam, by a suitable means not shown, the rack shaft 21 can be caused to shift axially in the intermittent shaft 7 so as to vary or change the eccentricity of the crank pin 6. It will be understood that the rack shaft 21 is keyed to rotate with the intermittent shaft 7 and that, therefore, the extension 25, which carries the roller 23 and which thus does not turn, is rotatably connected end to end with the shaft 21.

Referring to the specific embodiment of the invention, in the span control mechanism of a stator winding machine, shown in Figs. 6, 7 and 8, it will be seen that the intermittent device is assembled, as a more or less independent structure, on a base or platform 30, with the intermittent shaft 7 disposed horizontally at the upper part of the structure and mounted in the bearings 8 and 9, which are in turn supported in bosses formed on upstanding wall-like members 31 and 32, respectively, which are integral with the base 30.

The driving end of the shaft 7 projects outwardly from the bearing 9 and the crank head 18 is located on the outside of the bracket 32 where it is free and clear for operation of the connecting rod 5, which extends laterally from the intermittent unit for connection to the wire gun unit, as indicated in Fig. 1.

The controlled end of the shaft 7 projects beyond the bearing 8 into a space where the control head 13, together with its angularly projecting bearing elements, 14 and 15, may rotate without interference, except as such rotation is controlled by the control cam 16. The control cam 16 is mounted fast on the upper end of the shaft 17, which is disposed at right angles to the intermittent shaft 7, and the shaft 17 is journaled in spaced bearings 33 and 34 which in turn are mounted on a bracket 35 secured to an upstanding center wall 36 integral on the base 30. The control cam 16 is disposed horizontally, in the plane of the intermittent shaft 7, and is located laterally from the axis of the shaft 7 so that its axis will be intersected by the angularly extending axes of the bearing elements 14 and 15 as they are respectively engaged by the cam and held in horizontal position, as will be hereafter described.

The driving pinion 10, for the shaft 7, is located adjacent the crank end of the shaft 7, on the inner side of the bearing 9, and is engaged by the driving gear 11 which is mounted fast on the main power shaft 12. As shown, the power shaft 12 is journaled below the intermittent shaft 7 between suitable bearings 36 and 37 which are respectively mounted on a bracket 38, secured to the upstanding wall 31, and in a boss formed in the end wall 32, which supports the driving end of the shaft 7. The shaft 12 is driven from a suitable power source, not shown, by means of a gear 39 which is mounted fast on the shaft 12 between the gear 11 and the bearing 37. Preferably the power source is common to all of the operating components of the stator winding machine in order to provide a perfectly timed operational relationship between the said operating components.

As shown the control cam 16 is driven from the power shaft 12, which drives the pinion 10 and the intermittent shaft 7, in order that a perfectly timed relation may be had between the cam 16, and shaft 7 and the gear 11. The driving connection between the power shaft 12 and the cam shaft 17 is provided by a bevel gear 40, mounted on the inner end of the shaft 12, which gear meshes with another bevel gear 41 mounted on the upper end of an intermediate vertically disposed shaft 42 journaled in a bearing 43 supported by the bracket 38. The shaft 42 carries a gear 44 fast on its lower end and this gear is meshed with a pinion 45 mounted fast on the bottom end of the control cam shaft 17.

The mechanism shown in Figs. 6, 7 and 8 also includes the span change elements shown in the diagrammatic illustration of Fig. 1, and as shown the face cam 22, which actuates the span-change rack shaft 21—25, is disposed on a vertical axis at the opposite end of the assembly from the span crank 18. The cam 22 is located substantially in the plane of the intermittent shaft 7, with its axis intersecting an extension of the axis of the shaft 7, and the shaft 46, which supports and drives the cam 22, is mounted in vertically spaced bearings which are carried by a bracket 47 secured on the center wall 36. The shaft 46 is driven through bevel gears 48 and 49 from a drive shaft 50 which in turn is operated at predetermined intervals by control means, not shown, which form no part of the present invention.

As shown in Figs. 10, 11 and 12 the intermittent control cam 16 is a cylindrical body formed with a peripheral channel or cam track 51 and at one side a segment of the cam periphery is cut away to provide an axially extending opening 52 leading from end to end of the cam body. Thus the cam track 51 is not continuous but rather is an interrupted guideway having an entrance from the cam body opening 52 at one end and an exit into the said opening at the other end, as indicated by the arrows in Fig. 12. This control cam is intended to receive a cam follower through the top end of the body opening 52 and into the leading end of the cam track 51, hold the cam follower in fixed position for a predetermined period, and then to discharge the cam follower from the exit end of the cam track and through the bottom end of the body opening.

In the present embodiment of the invention there are two cam followers which consist of the bearing elements 14 and 15, projecting laterally from the control head 13 of the intermittent shaft 7. In the form shown each bearing element comprises a roller rotatably mounted on a stub shaft which projects outwardly from the control head 13 along an axis inclined endwise of the shaft 7 at an angle of 60 degrees from the shaft axis. Each roller is formed with a spherical periphery and the rollers are disposed on diametrically opposite sides of the control head 13. Thus as the rollers or bearing elements 14 and 15 gyrate about the axis of the shaft 7, upon rotation of the same, the rollers will be brought, successively, into operative engagement with the control cam.

The control cam 16 is positioned so that the axis of its drive shaft 17 is normal to a plane which includes the axis of the intermittent shaft 7 and also intersects an element of the path of the gyrating axes of the bearing elements 14 and 15; and the cam is so located that, when its axis is intersected by a bearing element axis, the respective bearing element will extend radially into and be fully engaged by the flat part of the cam track 51 which is disposed wholly within the plane of the shaft 7. Thus upon rotation of the shaft 7 and the cam 16, in properly timed relation, the bearing elements 14 and 15 will be delivered successively into the cam track through the upper end of the cam body opening 52, held in fixed position while the cam revolves, and finally be released and discharged downwardly through the bottom end of the cam body opening.

It will now be seen that although the intermittent shaft 7 is driven by a continuously rotating gear its own rotation is interrupted and the period of dwell or nonrotation is that period when a bearing element is engaged in the flat portion of the cam track 51. This action is made possible by interrupting the teeth of the pinion 10 at the diametrically opposite locations which are tangential with the gear 11 when the bearing elements 14 and 15, respectively, are engaged in the flat portion of the cam track, so that the pinion 10 is out of driving engagement, or out of mesh, with the gear 11 at those places.

Such an arrangement of the pinion teeth is shown in Fig. 9, and as shown four teeth are removed or omitted from each of diametrically opposite sides of the pinion 10 so that at those points there is no engagement with the gear 11. In this manner the gear 11 and pinion 10 are in driving engagement until one of the bearing elements is delivered into the flat portion of the control cam track 51, at which point the gear and pinion teeth become disengaged. When the respective bearing element reaches the release end of the cam track it is delivered from the end of the cam with a turning movement about the axis of the shaft 7 which rotates that shaft and causes the pinion teeth to again mesh with the rotating drive gear 11, whereupon the shaft 7 is positively driven to the point where the next tooth gap in the pinion 10 occurs. This substantially half-turn of the shaft 7 causes the second bearing element to be delivered to the control cam 16, and the intermittent shaft 7 is again held fast against any angular or turning movement while the second bearing element passes through the flat portion of the cam track.

The timing of the intermittent rotation of the shaft 7, and the intermittent engagement or meshing of the pinion 10 and gear 11, is governed by the design of the control cam 16. The angular length of the gap or peripheral opening 52 in the cam body represents that period in the cycle of cam rotation during which the intermittent shaft is turned, by the driving gear 11 and the pinion 10, to bring the next successive bearing element into engagement with the cam. The rise and fall of the cam track 51, at the entering and leaving ends respectively, represent the periods of transition or transfer of intermittent shaft rotation or control from the gear 11 to the cam and then from the cam to the gear 11. And the flat portion of the cam track represents the period in the cycle of cam rotation when the intermittent shaft is stopped and held fast.

Thus, it will be seen, the speed of rotation of the control cam 16 determines the time interval when the intermittent shaft is stationary and the frequency of the intermittent movements of the shaft; and the angular length of the gap or body opening in the cam is determined by the speed of rotation of the intermittent shaft 7 between dwell periods. For this last reason the driving speeds for the cam 16 and the intermittent shaft 7 must be positively and accurately correlated.

A simple method of correlating the drives, for the control cam 16 and the intermittent shaft 7, is to drive both elements directly from a common power source and this is the arrangement utilized in the specific embodiments of this invention shown in Figs. 6, 7, 8 and 13 wherein the drives for both the control cam 16 and the intermittent shaft 7 are taken by direct gearing from the power shaft 12.

A critical factor in the control cam design is the shape of the rise and fall portions of the cam track at the entering and leaving ends thereof where the bearing elements are received and discharged. Each bearing element is entered into the cam while the intermittent shaft is being positively driven by the pinion 10 and gear 11 and it is in the entrance or rise portion of the cam track that the transition of control of the intermittent shaft from the gears to the cam takes place. Likewise it is in the exit or fall portion of the cam track where control of the intermittent shaft is transferred from the control cam to the intermittent shaft drive. Therefore, since the bearing elements gyrate in a plane parallel to the axis of the control cam and pass through the cam in the axial direction thereof, the rise of the cam surface must be shaped to receive the bearing element at the speed of rotation of the pinion 10 as it is driven by the gear 11, pick up driving control of the bearing element as the last tooth preceding the gap in the pinion 10 disengages from the gear 11, and then bring the bearing element to rest in the flat of the cam track while more or less gradually absorbing the inertia of the intermittently moving parts. Also the fall of the cam track must be shaped to reverse these operations and discharge the bearing element in such a manner that the pinion 10 is brought up to the pitch circle speed of the gear 11 while the next pinion tooth, following the pinion-tooth gap, is caused to mesh precisely with the teeth of the running gear 11.

Referring particularly to Figs. 11 and 12 it will be seen that the entrance or rise 53 of the cam track 51 in the control cam 16 follows a downwardly curved path from the upper end of the body opening 52 to the flat portion 54. The curvature of this path is calculated, according to the speed of approach of the bearing element in relation to the speed of rotation of the cam, so that the bearing element will enter the cam path smoothly and without shock. Also the exit or fall 55 of the cam track is downwardly curved toward the bottom end of the body opening and is calculated to start the gyratory movement of the bearing element, and hence rotation of the intermittent shaft, smoothly and with such timing and acceleration that the pinion 10 will be brought into perfect meshing engagement with the gear 11 at the same pitch diameter speed. The method of calculating these cam paths will be readily understood by those skilled in the art.

As shown in Figs. 11 and 12 the cam track is made with upper and lower side walls, which are radial to the cam axis, and the side walls are angularly offset from each other. Also the curvatures of the upper and lower wall surfaces, at both the entrance and exit, are somewhat different from each other. The reason is that the centerline of the cam track is calculated with reference to the center of the bearing element, while the wall surfaces must be shaped to conform to the annular shape of the bearing elements at every point along their path through the cam. The upper and lower side walls are also spaced apart a distance substantially equal to the diameter of the bearing elements, with but a running clearance, in order that each bearing element will be positively held against angular movement during the dwell period. This obviates overrunning and backlash in the intermittent mechanism.

In the particular cam shown in Fig. 11 the clear body opening, for entrance and exit of the bearing elements, extends through 66 degrees of the cam circumference. It is during the passage of this space when control of the intermittent device is transferred from one bearing element to the other. The bearing element enters the cam and becomes engaged at substantially the point A and the 14 degree offset of the upper and lower cam track walls permits the bearing element to be engaged by the cam at diametrically opposite points. The bearing element reaches the flat of the cam track at the point B and is held stationary during the next 240 degrees of cam rotation. At the point C the bearing element enters the fall portion of the cam track and gyratory movement of the bearing element, and rotation of the intermittent shaft is begun. The angular movement of the bearing element is accelerated as it passes through the fall of the cam track and at the point D the teeth of the pinion 10 have become meshed with the gear 11 and the bearing element is released from the cam. The intermittent shaft is then rotated by the gear 11, while the cam continues to turn, until the next bearing element is shifted into the cam track entrance and the control operation is repeated. The speed of rotation of the intermittent shaft is such that the next bearing element is shifted into position to enter the cam track while the cam turns through substantially the angular extent of the cam body opening and when the bearing element reaches the point B the open portion of the pinion 10, where the teeth are omitted, is tangential to the gear 11 and the pinion is completely released from the gear. The angular length and the axial extent of the rise and fall of the cam track will, of course, vary according to the number of teeth removed from the pinion 10 to provide the intermittent gap.

Figure 13:
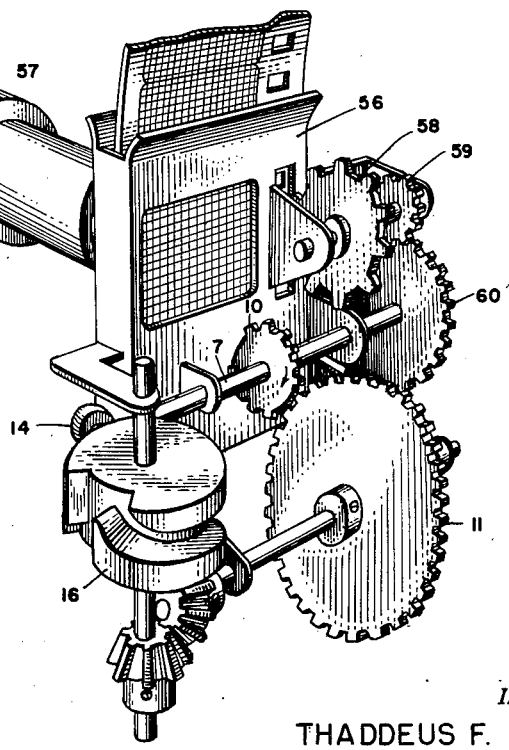
Fig. 13 is a schematic perspective view showing the intermittent device embodied in the film transport mechanism of a motion picture apparatus.

In the specific embodiment of the invention shown in Fig. 13 the improved intermittent device is utilized to perform the intermittent film transport operation in a motion picture mechanism. The arrangement of the intermittent elements is substantially the same as in Fig. 1 and like numerals have been used to designate like parts. 56 designates the film guide assembly, having the usual frame opening; and 57 designates the objective lens system. The film is driven through the guide assembly 56 by means of a sprocket 58 adapted and arranged to engage the marginal feed holes of the film strip as it passes through the guide assembly. The sprocket 58 is driven by a pinion 59, which in turn is driven intermittently by a gear 60 mounted fast on the intermittent shaft 7. The power shaft 12 is driven by a hand crank or a suitable motor means in the usual manner for operating motion picture mechanisms; and the intermittent control device is operated thereby in the same manner as has been hereinbefore described.

The main advantages of this invention reside in the high degree of accuracy with which a predetermined intermittent motion can be transmitted to an operating mechanism; and in the transmission of such motion with a complete absence of backlash or override in the driven parts. Other advantages of the improved intermittent device are to be found in the fact that the driven mechanism is started and stopped at precisely predetermined points in its operation, without shock or slap, and with a gradual acceleration and deceleration comparable with a simple harmonic motion.

Further advantages are to be found in the construction of the improved intermittent device whereby relatively heavy loads may be operated intermittently and at high rates of speed and frequency; and in the fact that the construction may be made in substantially any size and is readily adaptable to substantially any situation in which an intermittent movement is desired.

Although but one specific embodiment of this invention is herein shown and described it will be understood that numerous details of the construction shown may be altered or omitted without departing from the spirit of this invention as defined by the following claims.

I claim:

1. An intermittent movement device comprising a continuously operating driving means, a rotating member having a driving connection with said driving means, said driving connection being adapted to permit operation of said driving means independently of said rotating member, a projecting bearing element fixed to said rotating member and offset laterally relative to the axis thereof, a control means independent of said driving connection adapted to engage said bearing element at predetermined intervals and hold said bearing element in fixed position for a predetermined period, means to actuate said control means in timed relation with said driving means, and means on said control means adapted to release said bearing element at the end of said predetermined period for effecting driving operation of said rotating member by said driving connections.

2. An intermittent movement device comprising a continuously operating driving means, a rotating member having a driving connection with said driving means, said driving connection being adapted to permit operation of said driving means independently of said rotating member, a projecting bearing element fixed to said rotating member and offset laterally relative to the axis thereof, a control means comprising a rotatable body disposed in the path of said bearing element and having a peripheral cam track laying principally in a plane parallel with the axis of said rotating member, said cam track being adapted to receive said bearing element and having an entrance leading from one end of said body and an exit opening to the opposite end of said body, and means to drive said body in timed relation with said driving means.

3. An intermittent movement device comprising a continuously operating driving means, a rotating member having a driving connection with said driving means, said driving connection being adapted to permit operation of said driving means independently of said rotating member, a projecting bearing element fixed to said rotating member and offset laterally relative to the axis thereof, a control means comprising a rotatable cylindrical body disposed with its end margin intersecting the path of said bearing element and with its axis at right angles to the axis of said rotating member, said body having a peripheral channel entering from one end of the body and leaving from the opposite end thereof, said channel being adapted to receive and discharge said bearing element in the axial direction of said body and lying principally in the plane of said rotating member, and means to rotate said body in timed relation with said driving means.

4. An intermittent movement device comprising a rotatable shaft having means thereon to transmit motion therefrom, a continuously operating driving means having connection with said shaft for rotating the same, said connection having a dwell portion to interrupt the rotation of said shaft at predetermined intervals, a bearing element fixed to said shaft and disposed laterally from the axis thereof, and a control means independent of said driving means operating in timed relation with the interruptions of the rotation of said shaft and adapted to engage said bearing element and hold the same stationary for a predetermined period, said control means having means thereon for imparting angular movement directly to said bearing element at the end of said predetermined period.

5. An intermittent movement device comprising a rotatable shaft having means thereon to transmit motion therefrom, a pinion fast on said shaft, a continuously rotating gear positioned for driving engagement with said pinion, said pinion having a number of its teeth omitted to provide a peripheral space free of engagement with said gear, a bearing element fixed to said shaft in axially spaced relation to said pinion and disposed laterally from the axis thereof, and an independent control member driven in timed relation with said gear and positioned in the path of said bearing element, said control member having control means for engaging and holding said bearing element in fixed position for a predetermined period while said pinion is disengaged from said gear, said control means having a cam formation thereon adapted to release said bearing element and impart angular movement thereto at the end of said predetermined period.

6. An intermittent movement device comprising a rotatable shaft having means thereon to transmit motion therefrom, a pinion fast on said shaft, a continuously rotating gear positioned for driving engagement with said pinion, said pinion having a number of its teeth omitted to provide a peripheral space free of engagement with said gear, a bearing element fixed to said shaft and disposed laterally from the axis thereof, and an independent control member driven in timed relation with said gear and positioned in the path of said bearing element, said control member having a cam means to engage and hold said bearing element in fixed position for a predetermined period while said pinion is disengaged from said gear, said cam means having a leaving end portion inclined to impart angular movement to said bearing element and rotate said shaft at the end of said predetermined period and thereby cause meshing engagement of said gear and pinion.

7. An intermittent movement device comprising a rotatable shaft having means thereon to transmit motion therefrom, a pinion fast on said shaft, a continuously rotating gear positioned for driving engagement with said pinion, said pinion having a number of its teeth omitted to provide a peripheral space free of engagement with said gear, a bearing element fixed to said shaft and disposed laterally from the axis thereof, a control means positioned in the path of said bearing element and adapted to engage and hold said bearing element for a predetermined period upon disengagement of said pinion and gear, means to operate said control means in timed relation with said gear, and means on said control means adapted to impart angular motion to said bearing element and cause meshing engagement of said pinion and gear at the end of said predetermined period, said last named means being adapted to release said bearing element when said pinion and gear become meshed.

8. An intermittent movement device comprising a rotatable shaft having means thereon to transmit motion therefrom, a pinion fast on said shaft, a continuously rotating gear positioned for driving engagement with said pinion, said pinion having a number of its teeth omitted to provide a peripheral space free of engagement with said gear, a bearing element fixed to said shaft and disposed laterally from the axis thereof, a rotatable cylindrical cam positioned with its end margin intersecting the path of said bearing element and disposed on an axis at right angles to the axis of said shaft, a peripheral channel on said cam lying principally in a plane parallel with said shaft axis and having an entrance from one end of said cam and an exit from the other end of the cam, said channel being formed to receive and release said bearing element in the axial direction of said cam, and the exit end of said channel being formed to impart angular motion to said bearing element in timed relation with said gear to cause meshing engagement thereof with said pinion, and means to rotate said cam at a predetermined speed.

9. In an intermittent driving mechanism, the combination with an intermittently driven shaft having a pinion thereon adapted and disposed to mesh with a continuously rotating driving gear, said pinion having a tooth gap of predetermined angular extent at which said pinion and gear are disengaged, of a control means comprising a bearing element projecting laterally from the shaft axis, a rotatable cam adapted and disposed to engage said bearing element during disengagement of said pinion and gear, and means to rotate said cam in timed relation with the rotation of said gear, said cam having a cam track formed to impart angular movement to said bearing element at a predetermined period in the cam rotation and cause meshing engagement of the pinion teeth with said gear.

10. In an intermittent driving mechanism, the combination with an intermittently driven shaft having a pinion thereon adapted and disposed to mesh with a continuously rotating driving gear, said pinion having a tooth gap of predetermined angular extent at which said pinion and gear are disengaged, of a control means comprising a bearing element projecting laterally from the shaft axis, a rotatable cam adapted and disposed to engage said bearing element during disengagement of said pinion and gear, and means to rotate said cam in timed relation with the rotation of said gear, said cam having a cam track formed to impart angular movement to said bearing element at a predetermined period in the cam rotation and cause meshing engagement of the pinion teeth with said gear at the peripheral speed thereof, and said cam being formed to release said bearing element when said pinion and gear are engaged.

THADDEUS F. HARVEY.

REFERENCES CITED

The following references are of record in the file of this patent:

UNITED STATES PATENTS

| Number | Name | Date |
|---|---|---|
| 316,797 | Locke | Apr. 28, 1895 |
| 980,374 | White et al. | Jan. 3, 1911 |
| 1,129,754 | Story | Feb. 23, 1915 |
| 1,481,983 | Brightman | Jan. 29, 1924 |
| 1,559,970 | Meahl | Nov. 3, 1925 |
| 2,169,566 | May | Aug. 15, 1939 |